United States Patent [19]

DiDomenico, Jr.

[11] 4,451,622
[45] May 29, 1984

[54] URETHANE PREPOLYMERS CROSSLINKED WITH AMINO CROSSLINKING AGENTS

[75] Inventor: Edward DiDomenico, Jr., Anoka, Minn.

[73] Assignee: Henkel Corporation, Minneapolis, Minn.

[21] Appl. No.: 484,248

[22] Filed: Apr. 12, 1983

[51] Int. Cl.³ .............................................. C08L 75/04
[52] U.S. Cl. .................................... 525/456; 525/440; 525/509; 528/85
[58] Field of Search ....................... 525/509, 456, 440; 528/85, 60, 65, 85

[56] References Cited

U.S. PATENT DOCUMENTS

| | | | |
|---|---|---|---|
| 3,862,261 | 1/1975 | Stoddard | 525/456 |
| 3,959,201 | 5/1976 | Chang | 525/509 |
| 3,962,521 | 6/1976 | Chang et al. | 525/456 |
| 4,017,556 | 4/1977 | Wang | 525/456 |
| 4,125,570 | 11/1978 | Chang et al. | 525/456 |
| 4,216,344 | 8/1980 | Rogier | 528/85 |
| 4,229,562 | 10/1980 | Rogier | 528/85 |
| 4,304,945 | 12/1981 | Rogier | 528/85 |

Primary Examiner—Theodore E. Pertilla
Attorney, Agent, or Firm—Bacon & Thomas

[57] ABSTRACT

A composition of matter comprised of hydroxy-terminated urethane prepolymer and an amino crosslinking agent is disclosed. The composition is useful as a high solids coating.

8 Claims, No Drawings

URETHANE PREPOLYMERS CROSSLINKED WITH AMINO CROSSLINKING AGENTS

BACKGROUND OF THE INVENTION

1. Technical Field of the Invention

The present invention is directed to hydroxy functional urethane prepolymers, crosslinked with amino crosslinking agents.

2. Description of the Prior Art

It is known that short chained aliphatic primary polyols such as 1,4-butandiol and 1,6-hexanediol can be crosslinked with amino crosslinking agents such as alkoxyalkylmelamines. However, these products do not exhibit good film properties for coating applications. Coating properties can be modified using different crosslinking agents, by blending polyols or by modifying polyols through a chemical reaction to form a hydroxy terminated prepolymer.

Compositions prepared from urethane prepolymers and various amino crosslinking agents are disclosed in U.S. Pat. Nos. 3,542,718; 3,626,023; 3,804,810; 3,862,261; 3,912,790; 4,017,556; and 4,018,941. The disclosures of these patents, to the extent necessary for the understanding of the present invention, are hereby incorporated by reference.

SUMMARY OF THE INVENTION

The present invention is directed to a composition of matter which comprises (i) a hydroxy-terminated urethane prepolymer derived from at least one polyisocyanate and at least one polyol selected from the group consisting of hydroxymethyl polyols of the formulae:

$$H(CH_2)_hCH(CH_2OH)(CH_2)_kCH_2OH \qquad (I)$$

and $$CH_3(CH_2)_m[C(CH_2OH)_2]_n(CH_2)_p[C(CH_2OH)_2]_q(CH_2)_r[C(CH_2OH)_2]_s(CH_2)_t CH_2OH \qquad (II)$$

wherein n plus q plus s are integers, the sum of which is from 1 to 3; n, q and s are 0 or 1; m through t are integers, the sum of which is 12 to 20; and h and k are nonzero integers, the sum of which is 12 to 20; and (ii) a methylolamino compound.

The composition exhibits good coating properties and provides an alternative to existing compositions prepared from urethane prepolymers and amino crosslinking agents.

DETAILED DESCRIPTION OF THE PREFERRED EMBODIMENTS

The preparation of the hydroxymethyl polyol reactants of formulae I and II which are used to prepare the hydroxy-terminated urethane prepolymer is discussed in detail in U.S. Pat. Nos. 4,216,343, 4,216,344 and 4,304,945 to Rogier. Urethane products derived from these polyols and a polyisocyanate are described in U.S. Pat. No. 4,229,562 to Rogier. The disclosures of these patents are hereby incorporated by reference.

Most preferred among the hydroxymethyl polyols are hydroxymethyl octadecanols such as the diol, 9(10) hydroxymethyl octadecanol and mono-, di- and tri-bis(-hydroxymethyl)octadecanols such as 9,9(10,10)bis(hydroxymethyl)octadecanol, 9,9(10,10),12,12(13,13)-di[-bis(hydroxymethyl)]octadecanol and 9,9(10,10),12,12(13,13),15,15(16,16)-tri[bis(hydroxymethyl)]octadecanol. As explained in the aforementioned United States patents, the designations 9(10), 12(13) etc., are used to signify that the hydroxymethyl group may be attached at either the 9 or 10, 12 or 13 etc. position on the octadecanol chain. Hence, the polyols are in fact mixtures of the 9 and 10, 12 and 13 etc., isomers.

The polyol components may be modified by reaction with ethylene oxide, propylene oxide, styrene oxide, adipic and the phthalic acids and caprolactone.

To prepare hydroxy-terminated urethane prepolymers, the hydroxymethyl polyol reactant is provided in excess to the polyisocyanate to obtain a urethane linked reaction product having a hydroxy equivalent weight of at least 125 and preferably from 150 to 2500.

Suitable polyisocyanates include ethylene diisocyanate, trimethylene diisocyanate, hexamethylene diisocyanate, propylene-1,2-diisocyanate, ethylidene diisocyanate, cyclopentylene-1,3-diisocyanate, the 1,2-, 1,3- and 1,4-cyclohexylene diisocyanates, the 1,3- and 1,4-phenylene diisocyanates, polymethylene polyphenyleneisocyanates, the 2,4- and 2,6-toluene diisocyanates, the 1,3- and 1,4-xylene diisocyanates, bis(4-isocyanatophenyl)methane, 4,4'-diphenyl-propane diisocyanates, bis(2-isocyanatoethyl) carbonate, 1,8-diisocyanato-p-menthane, 1-methyl-2,4-diisocyanate-cyclohexane, the chlorophenylene diisocyanates, naphthalene-1,5-diisocyanate triphenylmethane-4,4',4"-triisocyanate, isopropylbenzene-alpha-4-diisocyanate, 5,6bicyclo[2.2.1]hept-2-ene diisocyanate, 5,6-diisocyanatobutylbicyclo[2.2.1]hept-2-ene and similar polyisocyanates.

Of particular interest in the present invention are trimethylene hexamethyl diisocyanate available from VEBA, heptadecyl (C17) diisocyanate, DDI 1410 an aliphatic C-36 diisocyanate available from the Henkel Corporation of Minneapolis, Minn., toluene diisocyanate available from Allied Chemical, isophorone diisocyanate available from Allied Chemical, isophorone diisocyanate available from VEBA and Desmodur N an aliphatic triisocyanate available from Mobay. Desmodur N is more particularly defined as the tri-isocyanate adduct of 3 moles of hexamethylene diisocyanate and water having an isocyanate equivalent weight as later defined of 191 grams. Other adducts or prepolymers of the polyisocyanate include Desmodur L and Mondur CB which are the adducts of toluene diisocyanate. The foregoing materials have an isocyanate equivalent weight of approximately 250 grams.

The second component of the composition of the invention is a methylolamino compound. As used herein, the term methylolamino denotes a compound which is the product of an amino compound and an aldehyde (usually formaldehyde, giving rise to the methyl term) and the etherified and partially etherified derivatives thereof. Thus, the term encompasses polyfunctional amino compounds of the formula:

$$(R'HN)_x-R-NHR''$$

where x is 1 or greater, R' and R" are hydrogen or other groups including cyclo forming carbons and R is a carbon containing backbone. Such methylolamino compounds, including melamines, guanamines, urea formaldehydes and glycoluril, are well known in the art. See, eg., U.S. Pat. No. 4,246,376 to DiDomenico and the references cited therein, the disclosures of which are hereby incorporated by reference.

The methylolamino compounds are generally sold as ethers of the reaction product of formaldehyde and an amino material such as melamine, urea, thiourea, guanamines, substituted thioameline, triaminopyrimidine, 2-mercapto-4,6-diaminopyrimidine, 3,5-diaminotriazole, carbamylguanazole, 2,4-diaminothiodiazole, glycoluril, and 2-oxo-4,5-diaminoparabanic acid.

Basically, the most practical components for use herein are the melamine, urea, glycoluril and guanamine materials. Stated simply, the preparation of such materials is old in the art and it is sufficient to say that formaldehyde is reacted with the amino hydrogens in varying amounts depending upon the type of resin which is desired. Thus, with melamine which contains three primary amine groups, it is necessary to react at least two of the amine hydrogens in order to form a product which will crosslink with a trifunctional alcohol. That is, the adduct of the amino compound and the formaldehyde is ordinarily sold as an ether, in most cases that of butanol. Etherification prevents the reaction product of the amino compound and formaldehyde from crosslinking and solidifying through continued reaction of the hydroxyl group on one of the reaction products with an unreacted amine hydrogen on another molecule of the amine compound. The etherification also modifies water and organic phase solubility, lessens self-condensation during cure; and gives a product which is less hygroscopic.

The particular advantage to using melamine based materials as the amino component is that both of the hydrogens on any amino group are available for reaction with formaldehyde, whereas when using urea it is difficult to react the second hydrogen following addition of the first mole of formaldehyde to the amino group.

Set out below are various tradenames of methylolamino compounds used in the present invention. These alcohols have been conveniently etherified with a material such as butanol or methanol or other monohydric alcohol to provide storage stability. A particularly useful material in the present invention is Cymel 303 obtained from the American Cyanamid Company. Other useful resins also available from American Cyanamid include the melamine formaldehydes sold as Cymel 300, 301, 350, 370, 373, 380, 1116, 1156 and 1130. The benzoguamines are sold as Cymel 1123, 1125 and 1134.

The urea-formaldehyde resins included herein are avaiable from American Cyanamid and include Beetle 60, 65, 80 and XB-1050. Partially alkylated melamine resins include Cymel 325, 370, 380, 243, 245, 248 and 255. The foregoing resins are described in a publication of American Cyanamid entitled Amino CrossLinking Agents.

Additional methylolamino compounds include the guanamides and benzoguanamines, substituted thioameline, triaminopyrimidine, 2-mercapto-4,6-diaminopyrimidine, 3,5-diaminotriazole, carbamylguanazole, 2,4-diaminothiodiazole, 2-oxo-4,5-diaminoparabanic acid and mixtures thereof.

The methylamino component of the composition is generally present in amounts, by weight, up to about 90%. The prepolymer may be present in amounts, by weight, up to 90%. Various modifiers may be included in the composition such as pigments, flow control agents, dispersants, etc., in minor amounts.

Coatings are prepared conveniently by using the methanol or butanol adduct of the methylolamino compound which is mixed with the polyol. The coating is applied by brushing, knife edge, spray or other conventional means followed by baking. Acid catalysts are employed at low levels to effect the cure.

The composition of the present invention as previously noted is highly useful in forming coatings, particularly coatings for laundry appliances, refrigerators, and generally for any metal requiring a protective coating. In particular, the composition of the present invention is highly useful in the area of high solids coatings requiring little or no volatile solvent in the product. It, for instance, has been extremely difficult to formulate coatings such as are described herein wherein high molecular weight alcohols are employed. That is, high molecular weight alcohols are ordinarily solid materials. However, using the components described herein, liquid coating compositions which exceed 70% solids and in some cases up to 100% solids can be obtained using conventional coating equipment such as high speed electrostatic disk applicators, conventional spray equipment, and hand application such as brushing.

The use of hydroxy-terminated urethane prepolymers instead of polyester or polyether prepolymers offers several advantages. First, the urethane linkages achieve better color and gloss retention than prepolymers with ether or ester linkages. Second, the urethane prepolymers can be manufactured at lower temperatures than polyester and polyether resins.

The use of the particular polyols of the invention in preparing the urethane prepolymer also offers advantages over other aliphatic poly-functional primary alcohols in that they have a much lower isocyanate demand which lowers the cost of the resin, they are not hydroscopic which reduces the water sensitivity of the cured film and they are not volatile, and so are not lost as solvents during curing with the amino crosslinking compounds.

To further illustrate the invention, the following Examples are provided; it being understood that their purpose is entirely illustrative and in no way intended to limit the scope of the invention.

In the Examples, all proportions of ingredients are given in parts by weight and the following ASTM testing procedures for coatings are used:

Pencil Hardness-ASTM D 3363-74
Flexibility Direct and Reverse Impact-ASTM D 2794-74

EXAMPLE 1

Prepolymer Preparation

A urethane linked prepolymer was prepared from the following reactants:

9(10)-hydroxymethyloctadecanol: 151.00
Isophorone diisocyanate (IPDI) (manufactured by VEBA): 95.76
Methyl Normal Amyl Ketone (MnAK): 140.00

The reactants were mixed until homogeneous. The reaction was allowed to proceed at ambient temperature. An I.R. scan taken one week after the initial mix showed no free NCO. The reaction product had a resin solids of 63.08% and a hydroxyl equivalent weight of 1702.

Coatings Preparation

The prepolymer was mixed with the following ingredients at room temperature:
Prepolymer: 315.00
Cymel 303: 35.00
Catalyst 4040: 3.50

Cymel 303 is a fully methylated melamine formaldehyde resin having an average equivalent weight=160. Catalyst 4040 is p-toluenesulfonic acid, a strong acid catalyst. Both products are manufactured by American Cyanamid.

The coating composition was applied by conventional air spray onto Bonderite 1000 cold rolled steel plate and cured at 150° C. for twenty minutes to a pencil hardness of H.

Film flexibility was measured by direct and reverse impact. The coating withstood 60 inch lbs. on direct, and 60 inch lbs. on reverse impact.

EXAMPLE 2

Prepolymer Preparation

A urethane linked prepolymer was prepared from the following reactants:

9,9(10,10)-bis(hydroxymethyl) octadecanol: 80.28
1,6 Hexamethylene diisocyanate (Mondur HX manufactured by Mobay Chemical Co.): 19.72

The reactants were mixed until homogeneous. The reaction was allowed to proceed at ambient temperature. An I.R. scan taken one week after the initial mix showed no free NCO. The reaction product had a hydroxy equivalent weight of 263.

Coatings Preparation

The prepolymer was mixed with the following ingredients at room temperature:

Prepolymer: 600.00
Cymel 303: 400.00
Catalyst 4040: 10.00
Ethylene glycol monoethyl ether acetate: 300.00

The coating composition was applied by conventional air spray onto Bonderite 1000 steel plate and cured at 150° C. for twenty minutes to a pencil hardness of 4H.

Film flexibility was measured by direct and reverse impact. The coating withstood 2 inch lbs. on direct but failed at 0.5 inch lbs on reverse impact.

EXAMPLE 3

Prepolymer Preparation

A urethane linked prepolymer was prepared from the following reactants:

9(10)-hydroxymethyl octadecanol: 151.00
Z4370 (a trifunctional aliphatic isocyanate manufactured by Mobay Chemical Co.): 165.50
Methyl Normal Amyl Ketone: 173.70

The reactants were mixed until homogeneous. The reaction was allowed to proceed at ambient temperature. I.R. scans were used to monitor the NCO content.

The reaction product had a hydroxyl equivalent weight of 992.5 and a solids content of 54.44%.

Coatings Preparation

The prepolymer was mixed with the following ingredients at room temperature:

Prepolymer: 490.20
Cymel 303: 135.64
Catalyst 4040: 4.01

The coating was applied by conventional air spray onto Bonderite 1000 steel plate and cured at 150° C. for twenty minutes to a pencil hardness of 2H.

Film flexibility was measured by direct and reverse impact. The coating withstood 20 inch lbs. on direct and 1 inch lb. on reverse impact.

From the foregoing detailed description and Examples, it should be apparent that the invention encompasses a wide range of compounds. It should also be apparent that while the invention has been described in terms of various preferred embodiments and exemplified with respect thereto those of skill in the art will readily appreciate that various modifications, changes, omissions, and substitutions may be made without departing from the spirit of the invention. It is therefore intended that the present invention be limited solely by the scope of the following claims.

I claim:

1. A composition of matter comprising (i) a hydroxy-terminated urethane prepolymer derived from a polyisocyanate and a polyol selected from the group consisting of hydroxymethyl polyols of the formulae:

$$H(CH_2)_h CH(CH_2OH)(CH_2)_k CH_2OH \qquad (I)$$

and $$CH_3(CH_2)_m[C(CH_2OH)_2]_n(CH_2)_p[C(CH_2OH)_2]_q(CH_2)_r[C(CH_2OH)_2]_s(CH_2)_t CH_2OH \qquad (II)$$

wherein n plus q plus s are integers, the sum of which is from 1 to 3; n, q and s are 0 or 1; m through t are integers, the sum of which is 12 to 20; and h and k are non-zero integers, the sum of which is 12 to 20 and (ii) a methylolamino compound.

2. The composition of claim 1, wherein said polyol is 9(10)hydroxymethyl octadecanol.

3. The composition of claim 1, wherein said polyol is 9,9(10,10)bis(hydroxymethyl) octadecanol.

4. The composition of claim 1, wherein said polyisocyanate is selected from the group consisting of toluene diisocyanate, xylene diisocyanate, isophorone diisocyanate, hexamethylene diisocyanate, the triisoxyanate adduct of hexamethylene diisocyanate and water, trimethyl hexamethylene diisocyanate, diphenylmethane diisocyanate, aliphatic diisocyanates having 12 to 40 carbon atoms in the aliphatic moiety and mixtures thereof.

5. The compoisition of claim 1, wherein said methylolamino compound is the reaction product of formaldehyde, a member selected from the group consisting of:
(a) melamine;
(b) urea;
(c) thiourea;
(d) guanamines and benzoguanamines;
(e) substituted thioameline;

(f) triaminopyrimidine;
(g) 2-mercapto-4,6-diaminopyrimidine;
(h) 2,5-diaminotriazole;
(i) carbamylguanazole;
(j) 2,4-diaminothiodiazole;
(k) 2-oxo-4,5-diaminoparabanic acid; and
(l) glycoluril,
and mixtures thereof.

6. The composition of claim 1, wherein said prepolymer is present in an amount ranging from about 10 to about 90%, by weight, and said methylolamino compound is present in an amount ranging from 90 to 10%, by weight.

7. The composition of claim 1, wherein said polyol is modified with a member selected from the group consisting of ethylene oxide, propylene oxide, styrene oxide, adipic acid, the phthalic acids and caprolactone acid mixtures thereof.

8. The cured product of claim 1.

* * * * *